Nov. 6, 1962　　　　L. L. CRUZEN　　　3,062,345
CLUTCH MECHANISM

Filed March 11, 1960　　　　　　　　　3 Sheets-Sheet 1

INVENTOR.
LARRY L. CRUZEN.
BY
*Wallace P. Lamb*
ATTORNEY.

Nov. 6, 1962

L. L. CRUZEN 3,062,345

CLUTCH MECHANISM

Filed March 11, 1960

INVENTOR.
LARRY L. CRUZEN.
BY

*Wallace P. Lamb*
ATTORNEY.

Nov. 6, 1962

L. L. CRUZEN 3,062,345

CLUTCH MECHANISM

Filed March 11, 1960

INVENTOR.
LARRY L. CRUZEN.
BY
Wallace P. Lamb
ATTORNEY.

//  # 3,062,345
CLUTCH MECHANISM

Larry L. Cruzen, Livonia, Mich., assignor to Burroughs Corporation, Detroit, Mich., a corporation of Michigan
Filed Mar. 11, 1960, Ser. No. 14,461
3 Claims. (Cl. 192—26)

This invention relates generally to clutch mechanisms and particularly to helical spring type clutch mechanisms.

It is an object of the invention to provide an improved clutch mechanism of the helical spring type in which declutching is effected in a manner to decrease friction and resultant wear between the clutch parts following declutching thereof.

Another object of the invention is to provide an improved clutch mechanism of the above mentioned character in which on declutching operation, the spring clutch member is completely disengaged from both the diriving and driven members of the clutch mechanism.

Another object of the invention is to provide an improved spring clutch having a range of operation commensurate with all driving speeds.

Specifically, in connection with the next proceeding object, it is an object of the invention to provide improvements in a radially expansible-contractable spring clutch so that it will function when used in low speed driving operations, as well as when used in high speed driving operations making it unnecessary to have different clutches for different driving speeds.

A further object of the invention is to provide an improved coil spring clutch mechanism which latches and holds the spring clutching member in declutched position in response to a predetermined tensioning of the spring clutching member.

Other objects of the invention will become apparent from the following detail description, taken in connection with the accompanying drawings in which.

Figure 1:
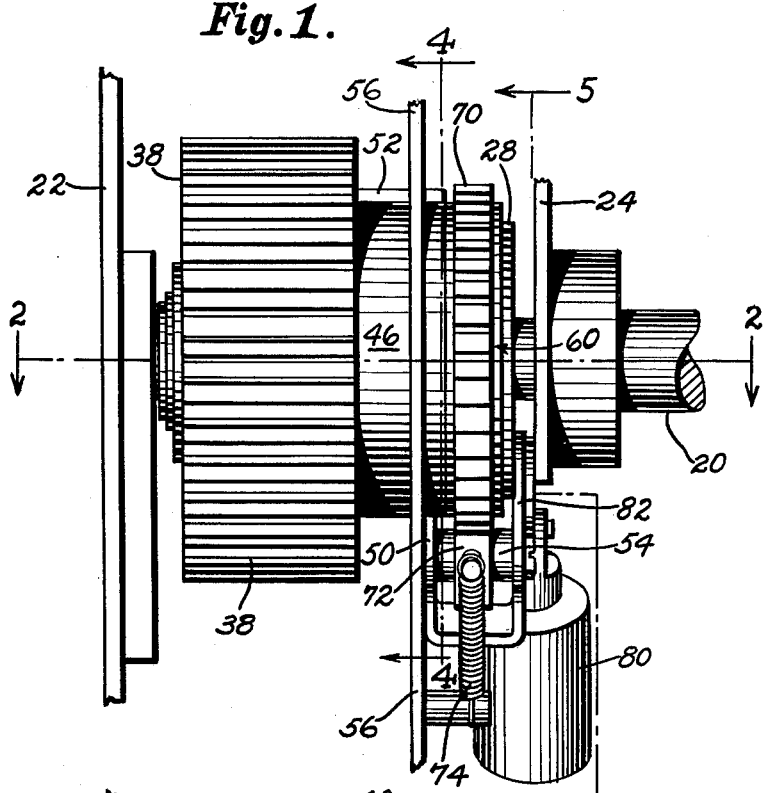
FIG. 1 is a side view of my clutch mechanism and associated structure.

Referring to the drawings by characters of reference, the clutch mechanism is shown mounted on a load driving shaft 20 between a pair of upright supporting members 22 and 24 on which the shaft is suitably journalled. The clutch mechanism comprises, in general, a driving member 26, a driven member 28 and an expansible-contractable clutch member or helical coil spring 30. The driving member 26 and the driven member 28 are axially aligned in end to end abutting relation, the driven member 28 being fixed to shaft 20 by a pin 32 and the driving member being journalled on a reduced end portion 34 of the driven member, such as by a suitable roller bearing 36.

In the present construction, the driving member 26 is shown as being the integral hub of a gear 38 which has an outer circumferential flange 40 on which external gear teeth are provided for driving connection with any suitable source of power. The outer peripheries of the driving and driven members 26 and 28 present cylindrical clutching surfaces for the spring clutch member 30 which is coaxial with and helically surrounds both the peripheries of the driven and driving clutch members.

Figure 3:
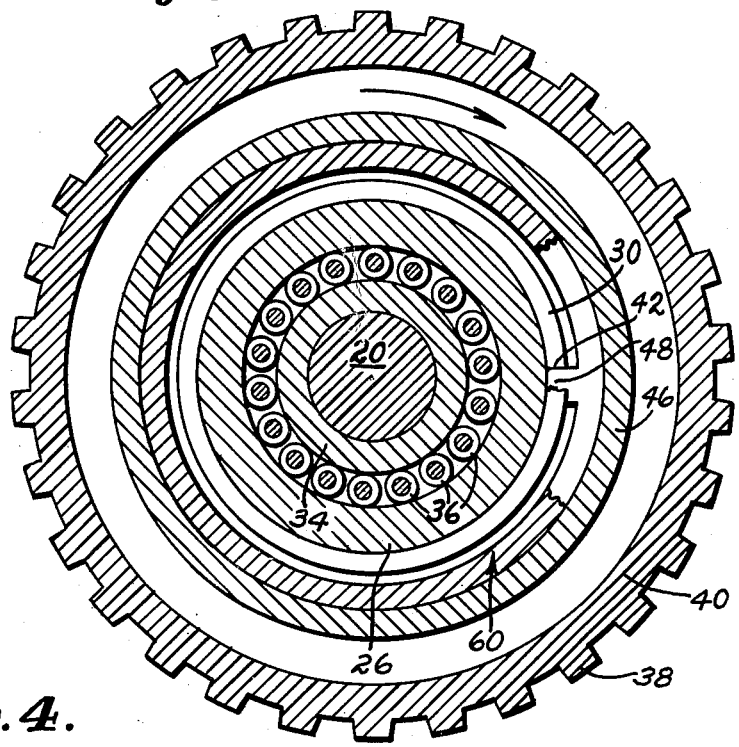
FIG. 3 is a cross sectional view, taken along the line 3—3 of FIG. 2.
Figure 4:
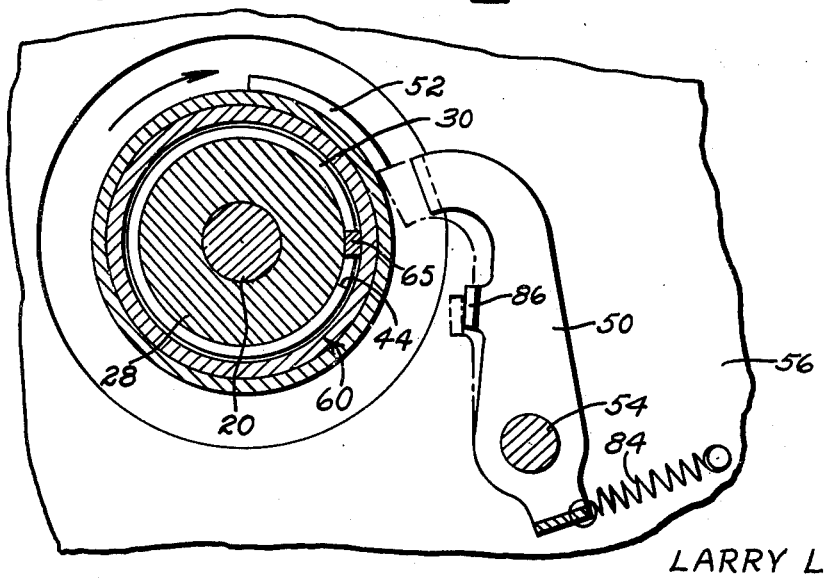
FIG. 4 is another cross sectional view, taken along the line 4—4 of FIG. 1.

The spring 30 is preferably made of square wire stock wound tightly, or such that the adjacent convolutions of the spring are normally substantially engaged throughout the length of the spring, providing a radially expansible-contractable clutching sleeve. Also, the inner diameter of the spring 30 is made sufficiently less than the common diameter of the driving and driven members 26 and 28 so that when assembled, the spring will have a radially inwardly directed contractural force to grip the driving and driven member. This gripping force of the spring 30 is increased by the rotation of the driving member 26 acting to further contract the spring radially to connect the driving and driven members for rotation together. Both ends of the spring 30 are free in the sense that they are not anchored. One of these spring ends, as at 42, is the leading end and the other, as at 44 is the trailing end with respect to the direction of rotation of the spring, as indicated in FIGS. 3 and 4.

A first rotatable clutch operating member 46 is provided to disengage the driving member 26 and driven member 28 by effecting radial expansion of the clutch spring 30. In the present construction, the clutch operating member 46 is in the form of a sleeve that surrounds the spring 30 and adjacent the inner face of the gear 38 the sleeve has an inturned abutment member or driving lug 48 externally of the sleeve and in abutting relation with the leading end 42 of the spring, as shown for example, in FIG. 3. When the clutch spring 30 is engaged, the driving connection comprising the leading end 42 of the spring and lug 48 will rotate the clutch operating member 46 until the clutch operating member is stopped by the engagement of a retractable stop member or arm 50 with a lug 52 that is secured to the periphery of the sleeve of the clutch operating member 46. The retractable stop arm 50 is pivotally mounted on a shaft 54 that is secured at one end thereof to an upright support 56.

Figure 6:
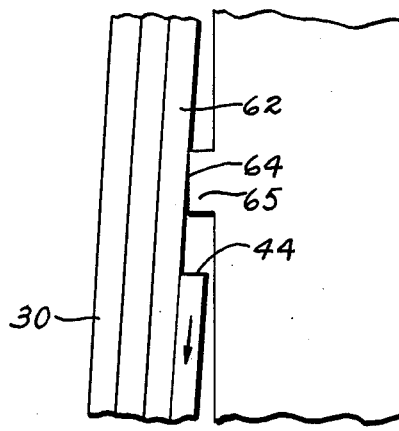
FIG. 6 is an enlarged fragmentary side view partly broken away and in section showing certain clutch components in clutched relationship.
Figure 7:
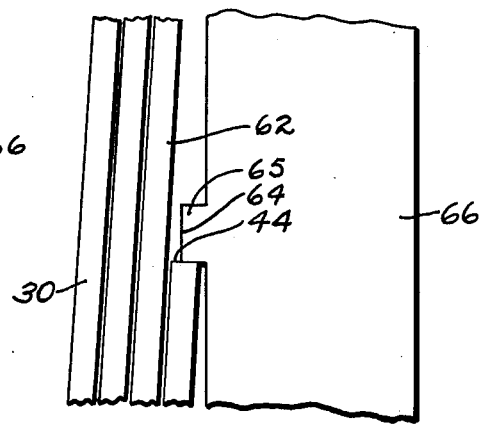
FIG. 7 is a view similar to FIG. 6 showing the clutch components in declutched relationship.

In accordance with the invention, I provide a second rotatable clutch operating or inertia member 60 which functions in response to operation of the clutch operating member 46 to further expand the clutch spring 30 so as to effect a complete disengagement of the spring from both of the clutch members 26 and 28. The clutch operating member 60 is rotatably mounted on the driven clutch member 28 and is driven, during engagement of the spring clutch 30 to develop a torque for application against the trailing end 44 of the spring 30. In order to releasably drive the clutch operating member 60 I provide a second clutch including a driving clutch member 62 and a driven clutch member 64. As shown in FIG. 6, the clutch driving member 62 is provided by the end coil of spring 30, adjacent the spring trailing end, and the driven clutch member 64 is formed on the end of an extension or lug 65 that extends axially from the inner end of a bushing 66 that is fixed in and to the clutch operating member 60. The clutch components 62 and 64 are shown engaged in FIG. 6 and it will be seen that because of the helix angle of the spring 30, the driving clutch member 62 engages the driven clutch member 64 in the direction of the arrow, with a wedging action to provide a driving connection between spring 30 and the rotatable clutch operating member 60. It will also be seen that if rotation of spring 30 is stopped, as will be the case when the clutch operating member 46 is stopped, then the momentum of the second clutch operating member 60 will disengage the clutch components 62 and 64 and the torque or inertia of the now freely rotating clutch operating member 60 will be applied by abutment of lug 65 with the spring trailing end 44 to further expand the spring as illustrated in FIG. 7. The clutch operating member 60 preferably has a sleeve 67 which surrounds the spring 30 and is suitably spaced therefrom by the bushing 66. Also, the sleeve 67 provides a mounting on which the sleeve of the clutch operating mechanism is rotatably mounted, as shown in FIG. 2.

Preferably, teeth are formed on the outer periphery of the clutch operating member 60 to provide a ratchet 70 having a retractable stop member or cooperating pawl 72 to stop and hold the clutch operating member 60 against rotation. The pawl 72 is pivotally mounted on the shaft 54 adjacent the stop arm 50 and is urged into engagement with the ratchet teeth by a spring 74. A power element, such as a solenoid 80, may be employed to retract or pivot the stop member 50 out of holding relation with the lug 52 and may be connected to an operating arm 82 of stop member 50. The solenoid 80 is opposed by a return spring 84 which pivots the stop member 50 to its effective position to stop rotation of the clutch operating member 46. A laterally extending lug 86 on stop member 50 engages the pawls 72 on retraction of stop member 50 so as to also retract the pawl at the same time that stop member 50 is retracted by the solenoid 80.

Operation

Figure 2:
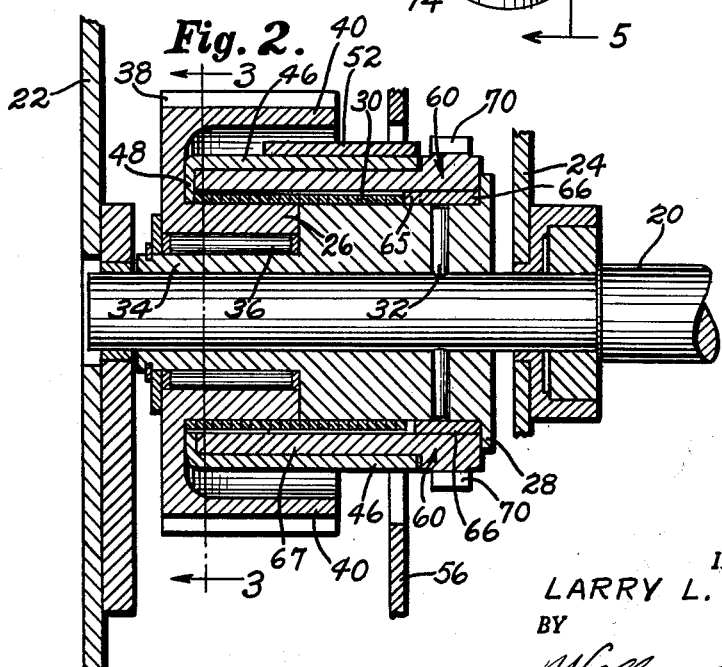
FIG. 2 is a horizontal sectional view taken along line 2—2 of FIG. 1.
Figure 5:
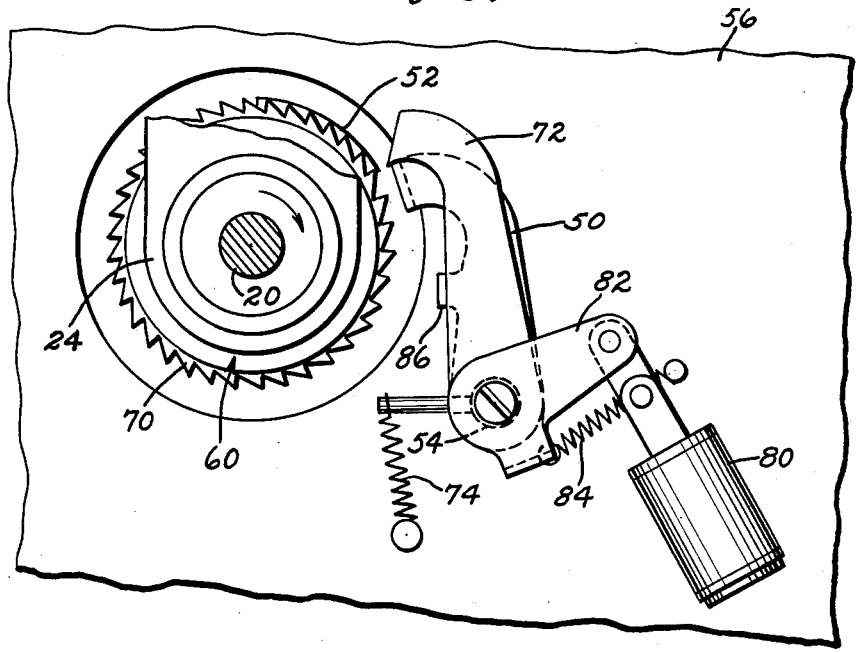
FIG. 5 is a cross sectional view, taken in the direction of the arrows 5—5 of FIG. 1.

When the stop member 50 and the pawl 72 are held in their retracted positions by the solenoid 80, as shown in FIG. 5, the clutch spring 30 is in its contracted or engaged state, as shown in FIG. 2, clutching the driven member 28 to the driving member 26. When the solenoid 80 is deenergized, such as by means of a time controlled switch (not shown), the springs 74 and 84 move the pawl 72 and stop member 50 into positions respectively to engage the ratchet 70 and the lug 52. The pawl 72 has no immediate effect on the ratchet 70, but the stop member 50 engages the lug 52 and stops rotation of the spring clutch operating member 46. Since the leading end 42 of the spring 30, through its driving connection with lug 48 has been rotating the clutch operating member 46, it will be apparent that the stopping of rotation of the member 46 will cause the spring to be expanded radially outwardly, disengaging the spring 30 from the driving member 26 and driven member 28. When the clutch operating member 46 stops rotation of the free end 44 of spring 30, the clutch components 62, 64 at the trailing end of the spring are disengaged by the radial expansion of the spring as such expansion is accompanied by axial contraction. This is augmented by clutch operating member 60 which continues by its momentum to rotate the move clutch member 64 away from clutch member 62. Thereafter, the clutch member 64 engages the trailing end 44 of the spring and further tensions the spring 30 radially outwardly. When the tension force of the spring 30 overcomes the torque of the operating member 60, the spring rotates the clutch operating member 60 in the opposite direction until the pawl 72 engages the nearest notch of the ratchet 70. Both of the clutch operating members 46 and 60 are now holding the spring 30 completely disengaged from both the driving and driven clutch members 26 and 28 which permits the load to decelerate unimpeded. When the solenoid 80 is again energized it will retract both the stop member 50 and the pawl 72 whereupon the spring 30 will be released to contract radially inwardly to again grip and connect the driving and driven members 26, 28 for rotation together.

The clutch operates as above described when the driving member 26 is operating at a relatively low speed. At high speeds of operation, when rotation of the spring 30 is stopped by the clutch operating member 46, the spring quickly expands and engages the inner periphery of and stops the clutch operating member 60. The tensioned spring 30 then starts to rotate the clutch operating member 60 in a direction reverse to the driving direction and rotates said member 60 until the pawl 72 engages the nearest notch of the ratchet 70.

While I have shown and described the invention in considerable detail, it will be appreciated that many variations may be made therein without departing from the spirit or scope of the invention.

What is claimed is:

1. A clutch mechanism comprising a rotatable driving member, a rotatable driven member in axial alignment with said driving member, a helical spring clutch member coaxial with and surrounding said driving and driven members, said spring clutch member tensioned to exert a radially inwardly directed force to grip said driving and driven members for rotation together and having free leading and trailing ends with respect to the direction of rotation of said driving member, a first rotatable clutch operating member disposed in the path and anterior to the lead end of said spring clutch member for rotation thereby, a second rotatable clutch operating member rotatable by a wedging drive connection with a portion of the spring clutch member convolution at the trailing end of the spring clutch member and disposed in angularly spaced relation with and posteriorly to the trailing end of said spring clutch member during the driving of said second clutch operating member through said wedging drive connection, a retractable stop member operable to stop rotation of said first clutch operating member to expand said spring clutch member to disengage the latter from said driving member and disengage said spring portion from the second clutch operating member, said second clutch member continuing by its momentum to engage the trailing end of said spring clutch member to rotate and further expand said spring clutch member until the spring force exceeds the torque of said second clutch operating member, and a second retractable stop member to stop and hold said second clutch operating member against rotation in a direction opposite to the direction of rotation of said driven member by said spring clutch member.

2. A clutch mechanism comprising a rotatable driving member, a rotatable driven member in axial alignment with said driving member, a helical coil spring clutch member coaxial with and surrounding both said driving and driven members, said spring clutch member tensioned to contract radially inwardly to grip and connect said driving and driven members for rotation together and having a free leading end and a free trailing end, a first rotatable clutch operating member engaged and rotated by the leading end of said spring clutch member, a second rotatable clutch operating member, a clutch component on and adjacent the trailing end of said spring clutch member engageable with a clutch component on said second clutch operating member to rotate the latter, means operable to stop said first clutch operating member to effect radial expansion of said spring clutch member and disengage both of said clutch components, said second clutch operating member continuing to rotate by its momentum following disengagement of said clutch components, an abutment member on said second clutch operating member to engage the trailing end of the spring clutch member to effect a further expanding of said spring clutch member until the tensioned force of the spring clutch member overcomes the torque of the second clutch operating member, and a holding member operable to hold said second clutch operating member against reverse rotation by said spring clutch member.

3. A clutch mechanism comprising a continuously rotating driving member, a driven member in axial alignment with said driving member, a coil spring clutch member coaxial with and surrounding both said driving and driven members, said spring clutch member to contract radially inwardly to grip and connect said driving and driven members for rotation together and having free leading and trailing ends, a first rotatable clutch operating member coaxial with said driving and driven members and driven by the lead end of said spring clutch member, a second rotatable clutch operating member rotatably mounted on said driven clutch member and rotatably supporting said first rotatable clutch operating member, a driven clutch component on said second rotatable clutch operating member, a driving clutch component on the convolution of said spring clutch member adjacent the trailing end thereof and cooperable with said driving clutch component to effect driving of said second rotatable clutch operating member by said spring clutch member, said second clutch operating member being operable by its momentum on disengagement of said clutch components to engage the trailing end of said spring clutch member and expand the latter, a retractable stop member operable to stop rotation of the leading end of said spring clutch member to effect disengagement from the driving member and disengagement of said clutch components, and a retractable stop member operable to hold said second clutch operating member against reverse rotation following the overcoming of the momentum of said second clutch operating member by said spring clutch member.

References Cited in the file of this patent
UNITED STATES PATENTS

| | | |
|---|---|---|
| 2,510,340 | Huck | June 6, 1950 |
| 2,885,042 | Frechette | May 5, 1959 |